(12) United States Patent
Endo et al.

(10) Patent No.: US 7,693,657 B2
(45) Date of Patent: Apr. 6, 2010

(54) NAVIGATION DEVICE

(75) Inventors: Yoshinori Endo, Kanagawa (JP);
Shinichi Amaya, Kanagawa (JP)

(73) Assignee: Xanavi Informatics Corporation (JP)

( * ) Notice: Subject to any disclaimer, the term of this patent is extended or adjusted under 35 U.S.C. 154(b) by 0 days.

(21) Appl. No.: 11/815,461

(22) PCT Filed: Jan. 30, 2006

(86) PCT No.: PCT/JP2006/301470

§ 371 (c)(1),
(2), (4) Date: Aug. 3, 2007

(87) PCT Pub. No.: WO2006/082788

PCT Pub. Date: Aug. 10, 2006

(65) Prior Publication Data
US 2009/0018759 A1    Jan. 15, 2009

(30) Foreign Application Priority Data
Feb. 3, 2005    (JP)    .............................. 2005-027434

(51) Int. Cl.
*G01C 21/30* (2006.01)
(52) U.S. Cl. .................. 701/210; 340/995.13
(58) Field of Classification Search ................ 701/210, 701/117, 208; 340/995, 995.11, 995.14, 340/995.13
See application file for complete search history.

(56) References Cited

U.S. PATENT DOCUMENTS 5,699,056 A * 12/1997 Yoshida ...................... 340/905
6,101,443 A * 8/2000 Kato et al. ................... 701/210
6,952,643 B2 * 10/2005 Matsuoka et al. ............ 701/117
7,376,509 B2 * 5/2008 Endo et al. .................. 701/209
7,486,201 B2 * 2/2009 Kelly et al. .................. 340/905

FOREIGN PATENT DOCUMENTS

| JP | 04-261575 | 9/1992 |
|---|---|---|
| JP | 07-320192 | 12/1995 |
| JP | 09-113290 | 5/1997 |
| JP | 09-236439 | 9/1997 |
| JP | 09-288799 | 11/1997 |
| JP | 10-111650 | 4/1998 |
| JP | 2001-133274 | 5/2001 |

OTHER PUBLICATIONS

Standard Technologies; User Interface of Car Navigation Device; URL http://jpo.go.jp/shiryou/s_sonota/hyoujun_gijutsu/gps/carnavi/326.htm; Mar. 1999.

* cited by examiner

*Primary Examiner*—Mark Hellner
(74) *Attorney, Agent, or Firm*—Antonelli, Terry, Stout & Kraus, LLP.

(57) ABSTRACT

A navigation device displays predicted traffic information downloaded from a server device and statistical traffic information stored in a storage unit, on the same screen. Both information items may be displayed in such a manner that at least a part of them is overlaid (a superimposed display). The predicted traffic information may be superimposed on the statistical traffic information. When traffic information of the same time band of the same object (link, mesh area) exists in both the information items, one thereof may be selected to be displayed.

14 Claims, 16 Drawing Sheets

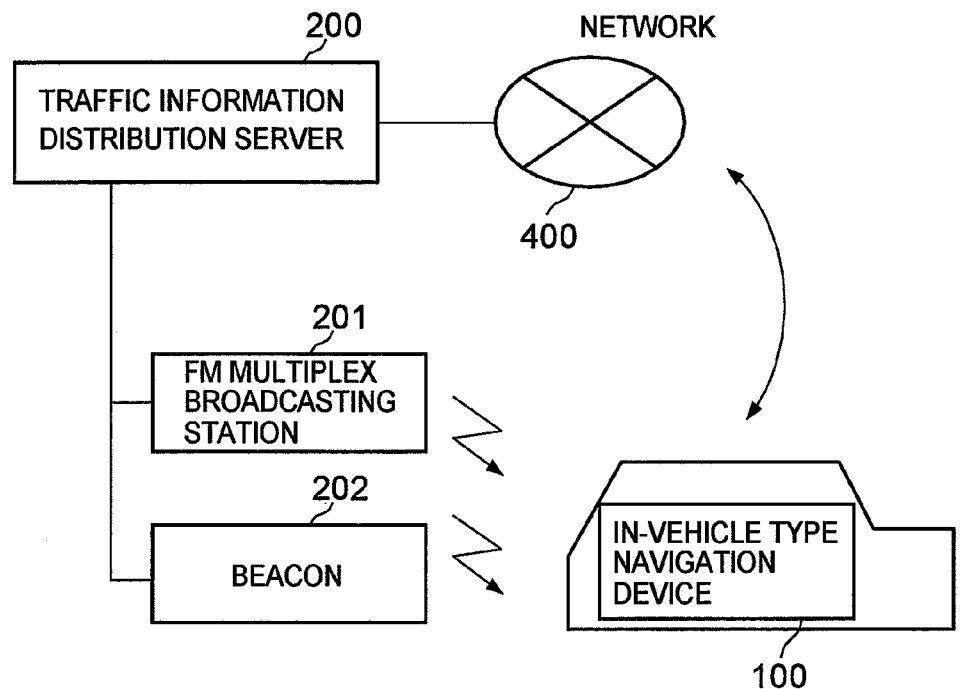

REAL-TIME CONTROL INFORMATION 220

| TYPE OF CONTROL | DATE & TIME | DETAILS | REASONS | CONTROL TARGET LINK ID |
|---|---|---|---|---|
| ROAD CLOSED | ** | NO ENTRY | VEHICLE ACCIDENT | ** |
| SPEED RESTRICTION | ** | LIMITED TO 30 km/h | INJURY ACCIDENT | ** |
| ⋮ | ⋮ | ⋮ | ⋮ | ⋮ |

FIG. 8

CONTROL INFORMATION 330

| TYPE OF CONTROL (331) | DATE & TIME (332) | DETAILS (333) | REASONS (334) | CONTROL TARGET LINK ID (335) |
|---|---|---|---|---|
| ROAD CLOSED | ** | NO ENTRY | MARATHON RACE | ** |
| SPEED RESTRICTION | ** | LIMITED TO 30 km/h | FESTIVAL | ** |
| ⋮ | ⋮ | ⋮ | ⋮ | ⋮ |

FIG. 9

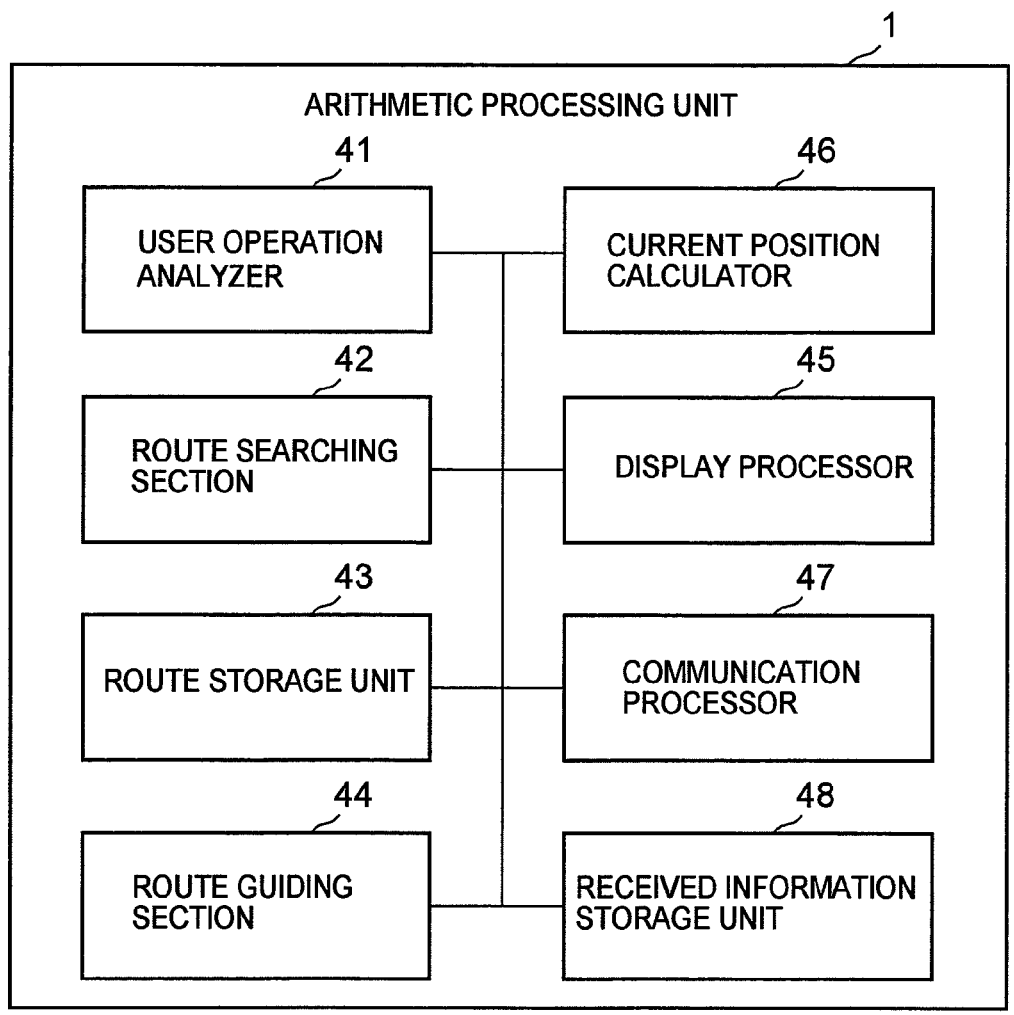

ARITHMETIC PROCESSING UNIT (1)

- 41 USER OPERATION ANALYZER
- 42 ROUTE SEARCHING SECTION
- 43 ROUTE STORAGE UNIT
- 44 ROUTE GUIDING SECTION
- 45 DISPLAY PROCESSOR
- 46 CURRENT POSITION CALCULATOR
- 47 COMMUNICATION PROCESSOR
- 48 RECEIVED INFORMATION STORAGE UNIT

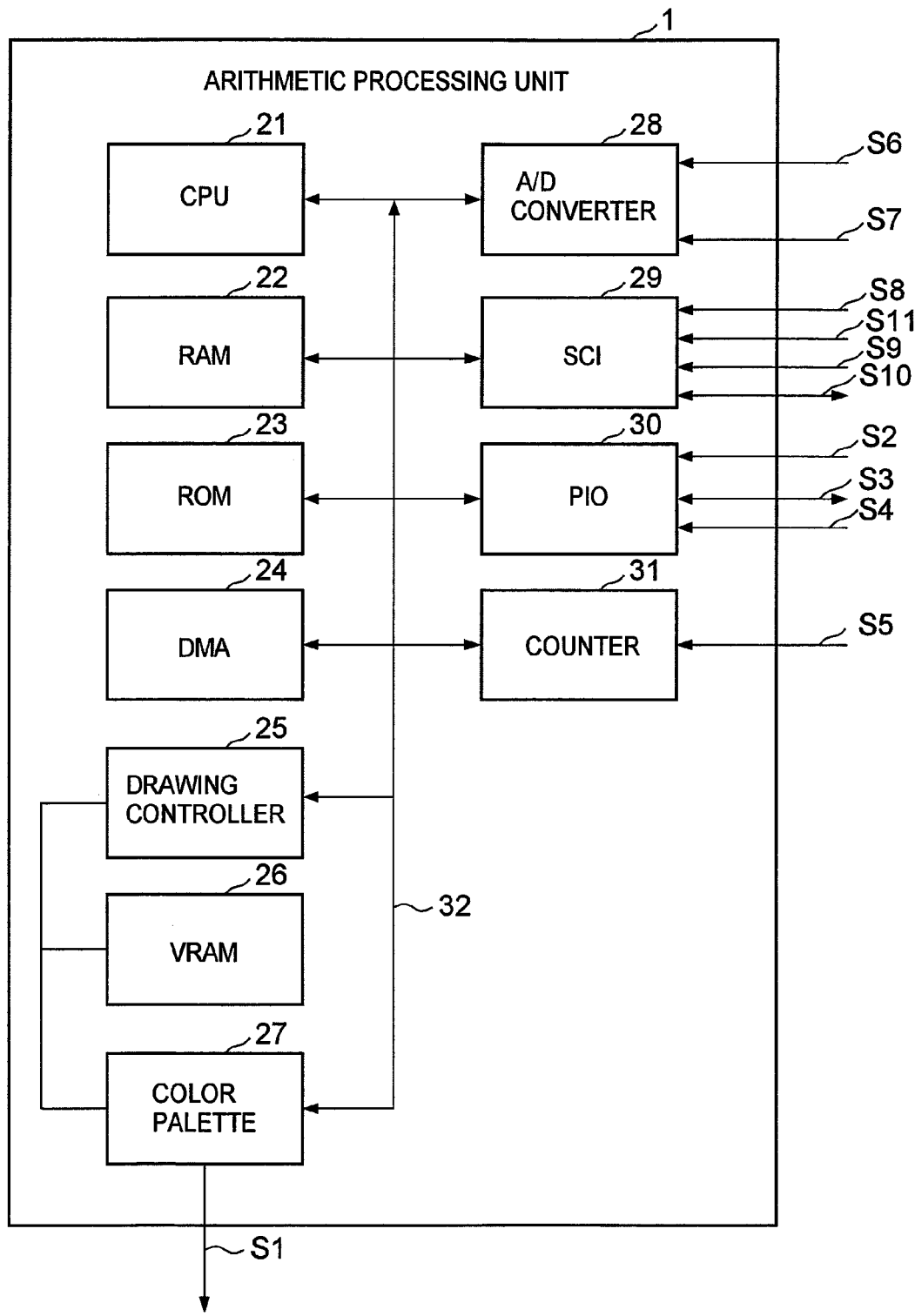

NAVIGATION DEVICE

TECHNICAL FIELD

The present invention relates to a navigation device, and more particularly, it relates to a traffic information displaying method of an in-vehicle type navigation device.

BACKGROUND ART

There is an in-vehicle type navigation device that displays traffic congestion information, and there is also an in-vehicle type navigation device that displays control information, such as road closure, speed restriction, or the like (see Non-Patent Document 1).

Non-Patent Document 1

Japan Patent Office, Standard Technologies, "User Interface of Car Navigation Device", Main Classification: 1-C-3, Congestion Location Display

DISCLOSURE OF THE INVENTION

Problem to be Solved by the Invention

If both the traffic congestion information and the control information having been obtained are merely displayed on the screen, the display screen may become cluttered with the information items to be displayed, resulting in an unclear view and deteriorated usability.

An object of the present invention is to provide a technique to display the traffic congestion information and the control information with enhanced usability.

Means to Solve the Problem

In order to solve the above problem, a navigation device according to the present invention includes a setting means that sets a focused time band, an obtaining means that obtains control information for the focused time band, an obtaining means that obtains traffic congestion information for the focused time band, and a display means that displays, on one screen, the control information and the traffic congestion information obtained.

The navigation device may include an extraction means that extracts, from the control information, a control information item containing a control-time within the focused time band, and a means to extract, from the traffic congestion information, a traffic congestion information item within the focused time band.

In addition, the navigation device may have a setting means that sets the focused time band, an obtaining means that obtains the control information at the current time, an obtaining means that obtains the traffic congestion information for the focused time band, and a display means that displays, on one screen, the control information and the traffic congestion information obtained.

The control information may be a control information item that is downloaded from a server device that distributes traffic information, or a control information item that is stored beforehand in a storage unit of the navigation device. The traffic congestion information may be an information item downloaded from the server device (predicted congestion information after the current time, which is generated by the current traffic information and the past traffic information), or the traffic congestion information stored beforehand in the storage unit of the navigation device (traffic congestion information generated by statistically processing the past traffic information).

BRIEF DESCRIPTION OF DRAWINGS

FIG. 1 is a schematic configuration diagram showing a navigation system relating to an embodiment of the present invention;

FIG. 2 is a configuration example of real-time predicted traffic information;

FIG. 8 is a configuration example of the control information stored beforehand in the storage unit 3;

FIG. 9 illustrates a functional configuration of an arithmetic processing unit 1;

FIG. 10 illustrates a hardware configuration of the arithmetic processing unit 1;

DENOTATION OF REFERENCE NUMERALS

Figures 3, 4:
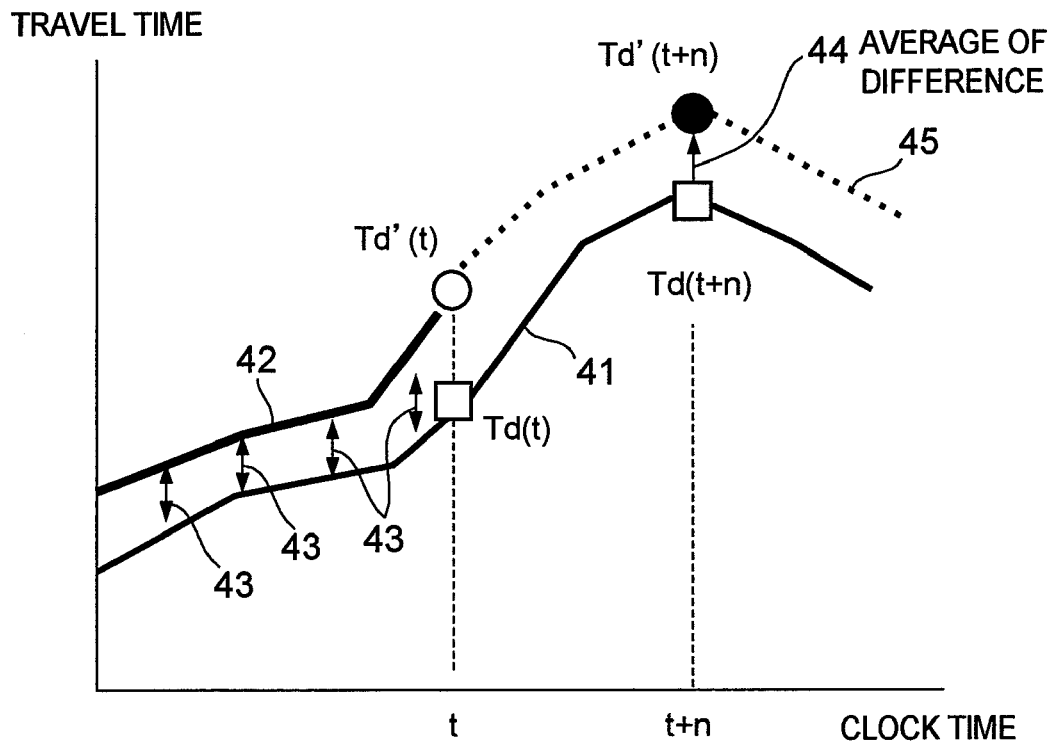
FIG. 3 is a chart to explain a method of how to generate the real-time predicted traffic information.
FIG. 4 is a configuration example of the real-time control information.

100 . . . In-Vehicle Type Navigation Device, 200 . . . Traffic Information Distribution Server, 400 . . . Network, 1 . . . Arithmetic processing unit, 2 . . . Display, 3 . . . Storage unit, 4 . . . Audio i/o unit, 5 . . . Input unit, 6 . . . Wheel speed sensor, 7 . . . Geomagnetic Sensor, 8 . . . Gyro, 9 . . . Gps receiver, 11 . . . In-vehicle lan unit, 12 . . . Fm multiplex broadcasting Receiver, 13 . . . Beacon receiver, 14 . . . Network Communication unit, 21 . . . Cpu, 22 . . . Ram, 23 . . . Rom, 24 . . . Dma, 25 . . . Drawing controller, 26 . . . Vram, 27 . . . Color palette, 28 . . . A/d converter, 29 . . . Sci, 30 . . . Pio, 31 . . . Counter, 41 . . . User operation Analyzer, 42 . . . Route searching section, 43 . . . Route Storage, 44 . . . Route guiding section, 45 . . . Display Processor, 46 . . . Current position calculator, 47 . . . Communication processor, 48 . . . Received information Storage

BEST MODE FOR CARRYING OUT THE INVENTION

Hereinafter, one embodiment of the present invention will be explained with reference to the accompanying drawings.

FIG. 1 is a schematic configuration diagram showing a navigation system relating to an embodiment of the present invention. As illustrated, the navigation system according to the present embodiment includes an in-vehicle type navigation device 100 and a traffic information distribution server 200. The in-vehicle type navigation 100 and the traffic information distribution server 200 are connected via a wireless communication base station (not illustrated) and a network 400. Furthermore, traffic information from the traffic information distribution server 200 is transmitted to the in-vehicle type navigation device 100, also by way of an FM multiplex broadcasting station 201 and a beacon 202.

The traffic information distribution server 200 is a server device that distributes traffic information to the in-vehicle type navigation device 100. The traffic information distribution server 200 holds real-time predicted traffic information 210 and real-time control information 220 in its own storage unit.

The real-time predicted traffic information 210 is future traffic information after the current time. This information is generated from the past traffic information and the current traffic information, and updated at any time. In other words, the real-time predicted traffic information 210 can be assumed as dynamic traffic information.

FIG. 2 is a configuration example of the real-time predicted traffic information 210. The real-time predicted traffic information 210 includes a travel time and the like within each time band, with respect to each link. In other words, the real-time predicted traffic information 210 includes, with respect to each identification code (mesh ID) 211 of a mesh area being a partitioned area on a map, a link identification code constituting a road (link ID) 212, a time band 213, a link travel time 214, and a traffic congestion degree 215.

Such predicted traffic information as described above can be generated based on the current traffic information and the traffic information collected in the past, and can be updated at any time. FIG. 3 shows an example of a method of how to generate the real-time predicted traffic information.

In FIG. 3, reference numeral 41 represents a temporal change of travel time Td of a certain link, which has been obtained from the traffic information collected in the past. Reference numeral 42 represents a temporal change of travel time Td' of the pertinent link, which is obtained from the current traffic information. Here, the current time is assumed as t.

Firstly, a difference 43 between the link travel time Td' 42 acquired from the current traffic information and the past link travel time Td 41 is obtained at predetermined intervals. Then, an average 44 of these obtained differences is calculated. The predicted travel time Td' (t+n) at the time of (t+n) can be obtained by Td(t+n)+(average of the differences).

The real-time control information 220 is control information at and after the current time. The real-time control information is updated at any time. In other words, the real-time control information 220 can be assumed as dynamic control information.

FIG. 4 is a configuration example of the real-time control information 220. The real-time control information 221 includes, for each record, type of control 221, range of control date and time (time band) 222, control details 223, reason for control 224, and link ID 225 of a link as a control target.

The type of control 221 may include, for example, road closure, left and right turn restriction, speed restriction, lane restriction, one-way restriction, tire-chain restriction, on-ramp restriction, closed to all large-sized vehicles, movement restriction, off-ramp restriction, and so on.

It is to be noted that the traffic information distribution server 200 may be a server that distributes the current traffic information.

Figure 5:
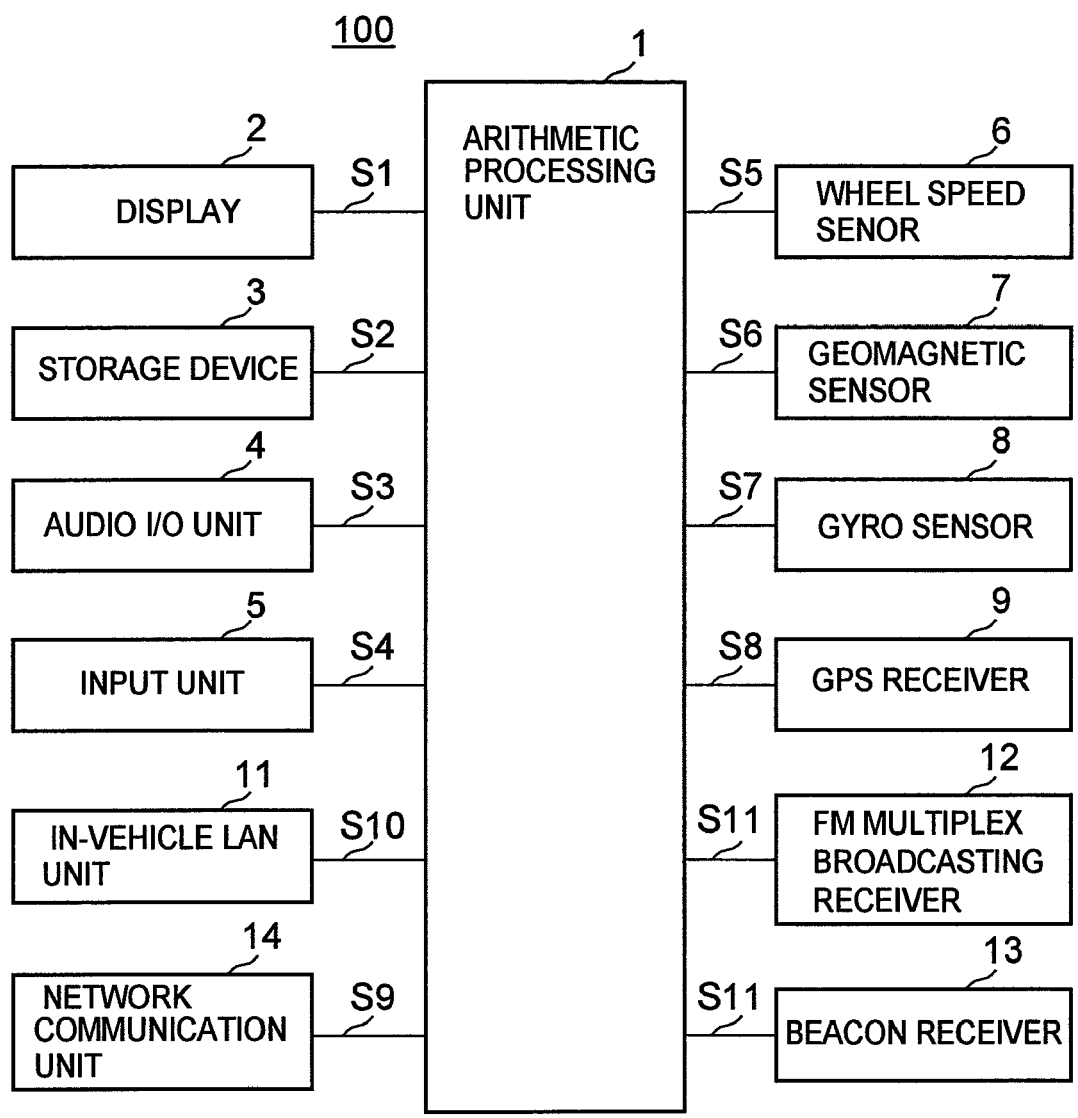
FIG. 5 is a schematic configuration diagram showing an in-vehicle type navigation device 100.

FIG. 5 is a schematic configuration diagram of the in-vehicle type navigation device 100. As illustrated, the in-vehicle type navigation device 100 includes an arithmetic processing unit 1, a display 2, a storage unit 3, an audio I/O unit 4, an input unit 5, a wheel speed sensor 6, a geomagnetic sensor 7, a gyro sensor 8, a GPS (Global Positioning System) receiver 9, an in-vehicle LAN unit 11, an FM multiplex broadcasting receiver 12, a beacon receiver 13, and a network communication unit 14.

The arithmetic processing unit 1 is a central unit that performs various processing. By way of example, the arithmetic processing unit 1 detects the current position based on the information outputted from the various sensors 6 to 8, and the GPS receiver 9. On the basis of the current position information obtained, the arithmetic processing unit 1 reads map data necessary for displaying, from the storage unit 3. The arithmetic processing unit 1 graphically develops the map data read out, and displays the map on the display 2, superimposing a mark representing the current position thereon. In addition, by the use of the map data stored in the storage unit 3 and the time-series traffic information received from the traffic information distribution server 200, the arithmetic processing unit 1 finds an optimum route (recommended route) that links the current position (departure point) and a destination specified by the user. In addition, the arithmetic processing unit 1 guides the user by using the audio I/O unit 4 and the display 2.

The display 2 is a unit that displays graphics information generated by the arithmetic processing unit 1. The display 2 is made up of a CRT, a liquid crystal display, or the like. A signal S1 is generally an RGB signal, NTSC (National Television System Committee) signal, or the like, and it is used for connecting the arithmetic processing unit 1 and the display 2.

The storage unit 3 incorporates a storage medium such as a CD-ROM, a DVD-ROM, a HDD, or an IC card. This storage medium stores map data 310, statistical traffic information 320, and control information 330.

Figure 6:
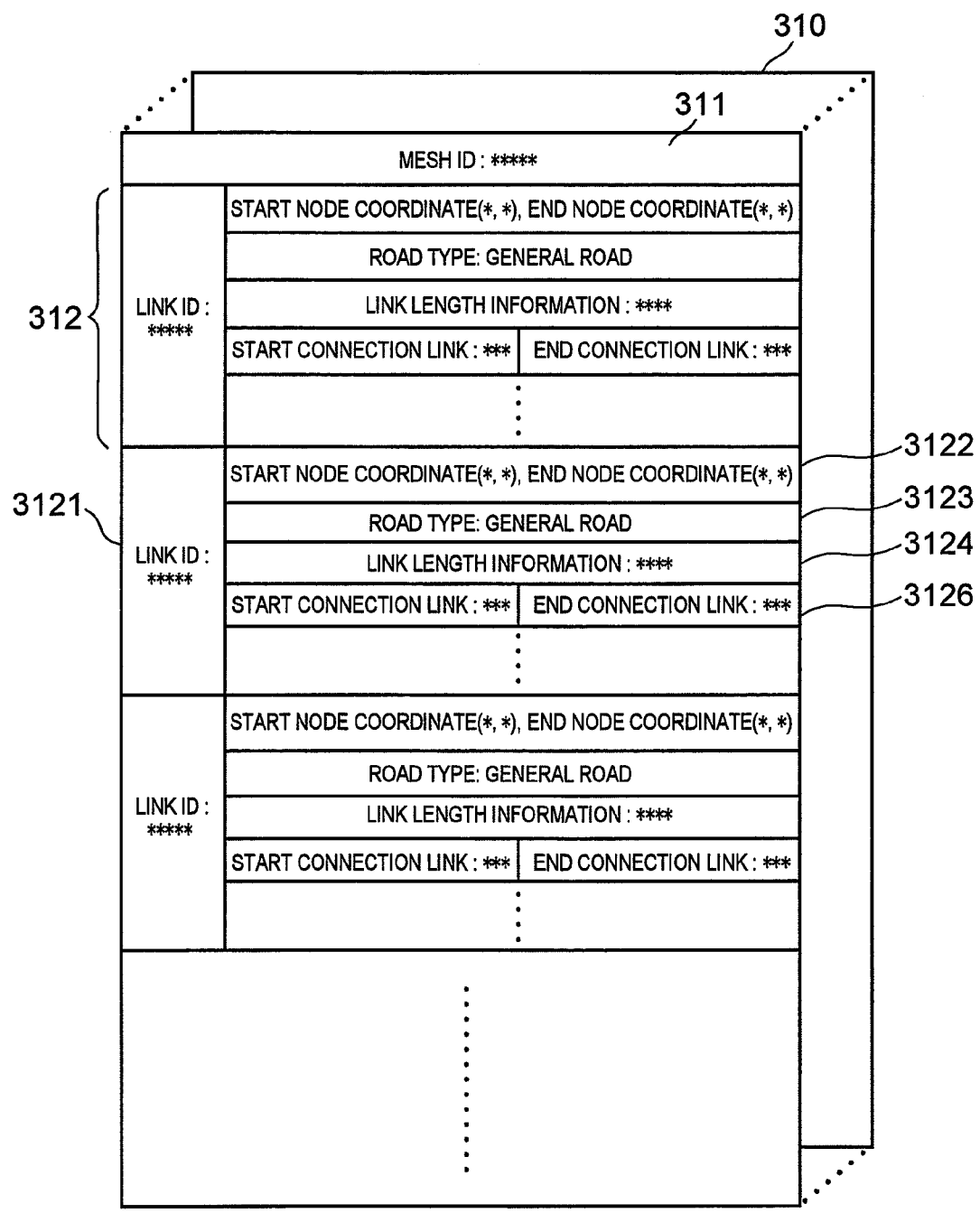
FIG. 6 illustrates a configuration of map data stored in a storage unit 3.

FIG. 6 illustrates a configuration of the map data 310. The map data 310 includes link data 312 of each of the links that constitute roads contained in a mesh area, with respect to each mesh ID 311.

The link data 312 includes, with respect to each link ID 3121, coordinate information 3122 of two nodes (start node and end node) that constitute a link, type information 3123 of a road including the link, link length information 3124 indicating the length of the link, a link ID (connection link ID) 3126 of the link that is connected to each of the two nodes, and the like. Here, it is to be noted that with respect to the two nodes constituting the link, by distinguishing between the start node and the end node, inbound and outbound directions of the same road are managed as different links. In addition, the map data 310 further includes information (such as name, type, and coordinate information) of map constituent elements outside of the roads that are included in the associated mesh area.

Figure 7:
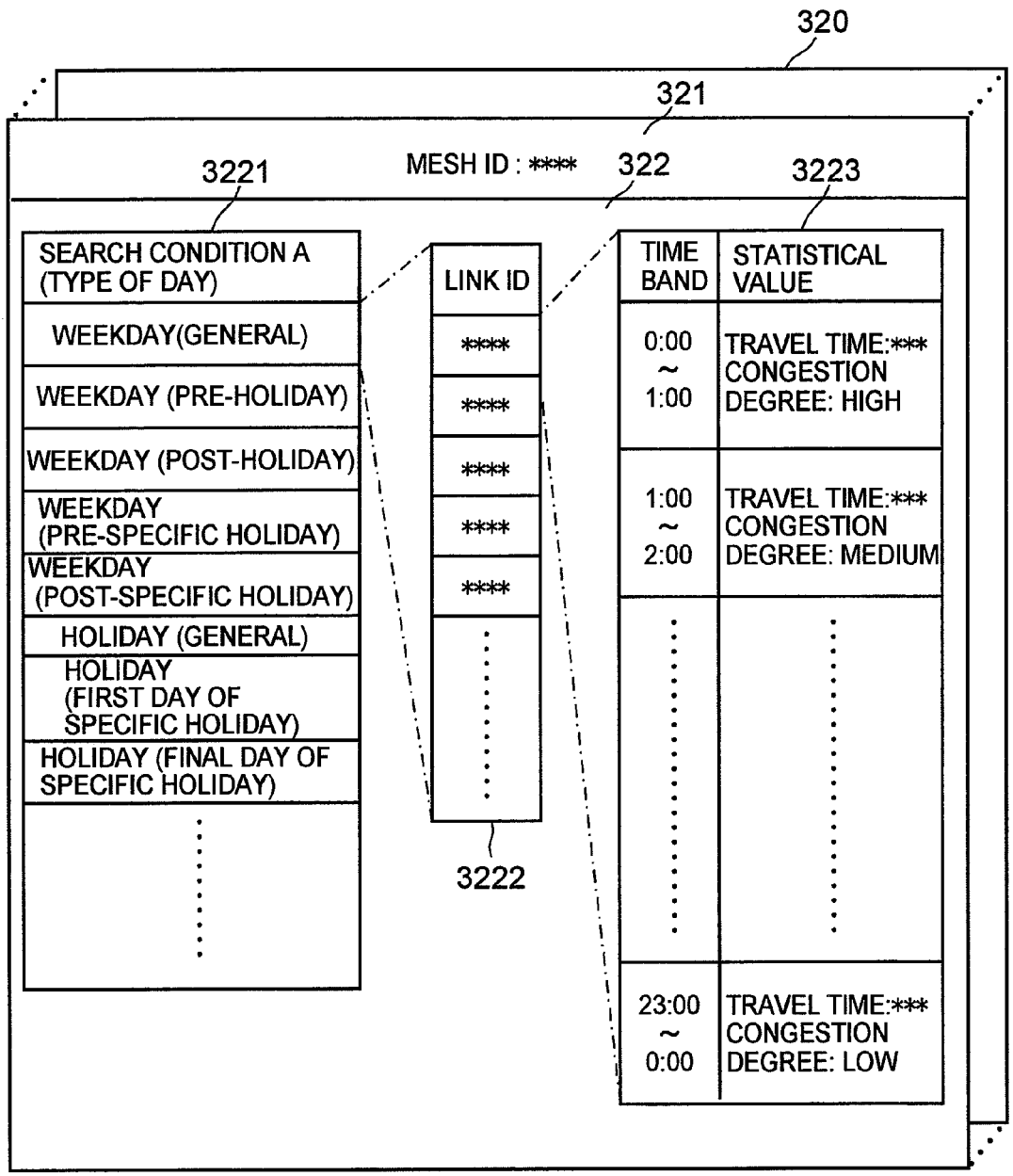
FIG. 7 illustrates a configuration of statistical traffic information stored in the storage unit 3.

FIG. 7 illustrates a configuration example of the statistical traffic information 320 stored beforehand in the storage unit 3. The statistical traffic information 320 is generated by statistically processing past traffic information, and it can be assumed as static traffic information.

As illustrated, the statistical traffic information 320 is stored for each mesh area described above. The statistical traffic information 320 includes mesh ID 321 of the mesh area, and management data 322 that manages traffic information statistical value (statistical value of traffic information collected in the past) of each of the links constituting a road included in the mesh area. The mesh ID 321 is the same as the mesh ID 311 of the map data 310. Multiple tables 3221 to 3223 having a hierarchical structure constitute the management data 322.

Table 3221 is a table that registers type of day. The type of day may be defined for each unit in which the traffic information statistical value shows a different trend. Here, the type of day may include, weekday before holiday "weekday (pre-holiday)", weekday after holiday "weekday (post-holiday)", weekday before a specific holiday such as Bon holiday and New year's day, "weekday (pre-specific holiday)", weekday after holiday "weekday (post-specific holiday)", other weekday "weekday (general)", first day of the specific holiday "holiday (first day of specific holiday)", final day of the specific holiday "holiday (final day of specific holiday)", or other holiday "holiday (general)".

The table 3222 is a table to register the link ID of each link constituting the road included in the mesh area registered with the mesh ID 321, and this table is provided for each day type registered in the table 3221. The link ID is the same as the link ID 3121 of the map data 310.

The table 3223 is a table for registering traffic information statistical values with respect to each time band, and this table is provided for each link ID registered in the table 3222. The traffic information statistical values for each time band may include a link travel time and a link congestion degree, which are specified by multiple traffic information items as sources of the statistical values. In addition, the traffic information statistical values for each time band are classified by a condition under which the source traffic information was collected (by a day type when the source traffic information was collected), and a target link. In other words, a target link for the traffic information statistical values for each time band registered in the table 3223 is a link specified by the link ID of the table 3222, associated with the table 3223. The source traffic information of the statistical values is traffic information collected on a day specified by the day type of the table 3221, being associated with the table 3222 in which this link ID is registered.

FIG. 8 illustrates a configuration of the control information 330 that is stored in the storage unit 3. The real-time control information 220 described above includes control information determined by occurrence of contingencies such as vehicle accident, and disasters. On the other hand, the control information 330 stored beforehand in the storage unit 3 includes scheduled control information, such as road closure in winter, and traffic controls for annual events such as a marathon race or a festival. In other words, the control information 330 stored beforehand in the storage unit 3 can be assumed as static control information.

The control information 330 includes, for each record, control type 331, control date and time range (time band) 332, control details 333, control reason 334, and link ID 335 of a link that is to be controlled. The type of control 331 may include, for example, road closure, left or right turning restriction, speed restriction, lane restriction, one-way restriction, tire-chain restriction, on-ramp restriction, closed to all large-size vehicles, movement restriction, off-ramp restriction, and so on.

Explanations are continued, returning to FIG. 5. The audio I/O unit 4 converts a message, generated for the user in the arithmetic processing unit 1, into an audio signal. In addition, the audio I/O unit 4 further performs processing to recognize the user's speech, and to transfer the contents thereof to the arithmetic processing unit 1.

The input unit 5 is a unit for accepting a directive from the user. The input unit 5 is made up of hard switches such as a scroll key and a scale change key, a joystick, and a touch panel placed on the display.

The sensors 6 to 8 and the GPS receiver 9 are used by the in-vehicle type navigation device 100 to detect current position (own vehicle position). The wheel speed sensor 6 measures distance by the product of wheel circumference and the measured number of revolutions thereof, and further measures an angle through which the moving object turns, based on difference in the number of revolutions of a wheel pair. The geomagnetic sensor 7 senses the earth's magnetic field, and detects a direction in which the moving object is facing. The gyro 8 is made up of an optical fiber gyro, a vibration gyro, or the like, and it detects an angle through which the moving object has turned. The GPS receiver 9 receives a signal from a GPS satellite to measure distance between the moving object and the GPS satellite, and a change rate of the distance, and this measurement is performed with regard to three or more GPS satellites, thereby measuring current position, travel speed, and travel azimuth of the moving object.

The in-vehicle LAN unit 11 receives various kinds of information regarding a vehicle on which the in-vehicle type navigation device 100 is mounted. The various kinds of information may include, for example, door open/close information, light ON/OFF state information, engine state, result of failure diagnosis, and so on.

The FM multiplex broadcasting receiver 12 receives general current traffic information, real-time control information, SA/PA (service station/parking) information, and weather information, which are transmitted in the form of an FM multiplex broadcasting signal from an FM multiplex broadcasting station.

The beacon receiver 13 receives current traffic information including link travel time, real-time control information, SA/PA information, and parking area information, which are transmitted from the beacon.

The network communication unit 14 acts as an intermediary for sending and receiving information between the in-vehicle type navigation device 100 and the traffic information distribution server 200. In addition, the network communication unit 14 accesses the traffic information distribution server 200, and receives real-time predicted traffic information, real-time control information, and current traffic information, periodically or upon conducting a route search.

FIG. 9 illustrates a functional configuration of the arithmetic processing unit 1.

As illustrated, the arithmetic processing unit 1 includes a user operation analyzer 41, a route searching section 42, a route storage unit 43, a route guiding section 44, a current position calculator 46, a display processor 45, a communication processor 47, and a received information storage unit 48.

The current position calculator 46 utilizes distance data and angular data, which are obtained by integrating each of the distance pulse data S5 measured by the wheel speed sensor 6 and the angular acceleration data S7 measured by the gyro 8, and periodically calculates the current position (X', Y') by integrating the distance data and the angular data on a time axis. The current position (X', Y') is a position after the vehicle itself has traveled from the initial position (X, Y). In addition, a map matching process is performed by the use of a result of the calculation, thereby fitting the current position into a road (link) having the highest correlation in shape.

The user operation analyzer 41 receives a request from the user inputted into the input unit 5, analyzes the content of the request, and controls each element in the arithmetic processing unit 1 so that processing responding to the request content is executed. By way of example, when the user requests a search to be made for a recommended route, the user operation analyzer 41 requests the display processor 45 to perform a processing to display a map on the display 2, so that the user is allowed to set a destination. The user operation analyzer 41 further requests the route searching section 42 to perform processing to calculate a route from the current position (departure place) to the destination.

The route searching section 42 makes a search for a route that achieves the minimum cost (for example, travel time), out of routes connecting two specified points (the current position and the destination), by the use of the Dijkstra method or the like. The route storage unit 43 stores the route information that is searched by the route searching section 42.

The route guiding section 44 performs route guidance, utilizing the route thus searched by the route searching section 42. By way of example, the route guiding section 44 compares the route information with the current position information, and gives the user audio information as to whether the user should go straight or turn to the right or left, before passing a crossing, by using the audio I/O unit 4. In addition, the route guiding section 44 displays direction for proceeding on the map being displayed on the display 2, and notifies the user of a recommended route.

The display processor 45 receives, from the storage unit 3, map data of an area that is requested to be displayed on the display 2, and generates a map drawing command so that a road, other map constituents, current position, a destination, and a mark such as an arrow for guiding along a route are drawn at a designated scale and in designated drawing mode. Then the display processor 45 transmits the generated command to the display 2.

Upon accepting a request for downloading predicted traffic information and the like, the communication processor 47 establishes a connection with the traffic information distribution server 200 by way of the network communication unit 14, and requests downloading the real-time predicted traffic information, the real-time control information, and the current traffic information. Then, the communication processor 47 stores the information having been downloaded in the received information storage unit 48.

In addition, the communication processor 47 stores, in the received information storage unit 48, the real-time predicted traffic information, the real-time control information, and the current traffic information received from the FM multiplex broadcasting station 201 and the beacon 202. It is to be noted that if the storage unit 3 is made of a rewritable HDD, flash ROM, or the like, the communication processor 47 may store the received information in the storage unit 3.

FIG. 10 illustrates a hardware configuration example of the arithmetic processing unit 1.

As illustrated, the arithmetic processing unit 1 has a structure such that various units are connected to one another through a bus 32. The arithmetic processing unit 1 includes a CPU (Central Processing Unit) 21 which performs various processing such as controlling the numerical calculation and each unit, RAM (Random Access Memory) 22 which stores map data and calculation data which are read from the storage unit 3, a ROM (Read Only Memory) 23 which stores programs and data, DMA (Direct Memory Access) 24 which performs data transmission between memories and between each memory and each unit, a drawing controller 25 which performs graphics drawing and also performs display control, a VRAM (Video Random Access Memory) 26 which stores graphics image data, a color pallet 27 which converts image data to RGB signals, an A/D converter 28 which converts analog signals to digital signals, an SCI (Serial Communication Interface) 29 which converts serial signals to parallel signals which are synchronized with the bus, a PIO (Parallel Input/Output) 30 which inputs the parallel signals on the bus in synchronism with the bus, and a counter 31 which integrates pulse signals.

Explanation of Operations

Next, an operation of the in-vehicle type navigation device 100 will be explained.

Figure 11:
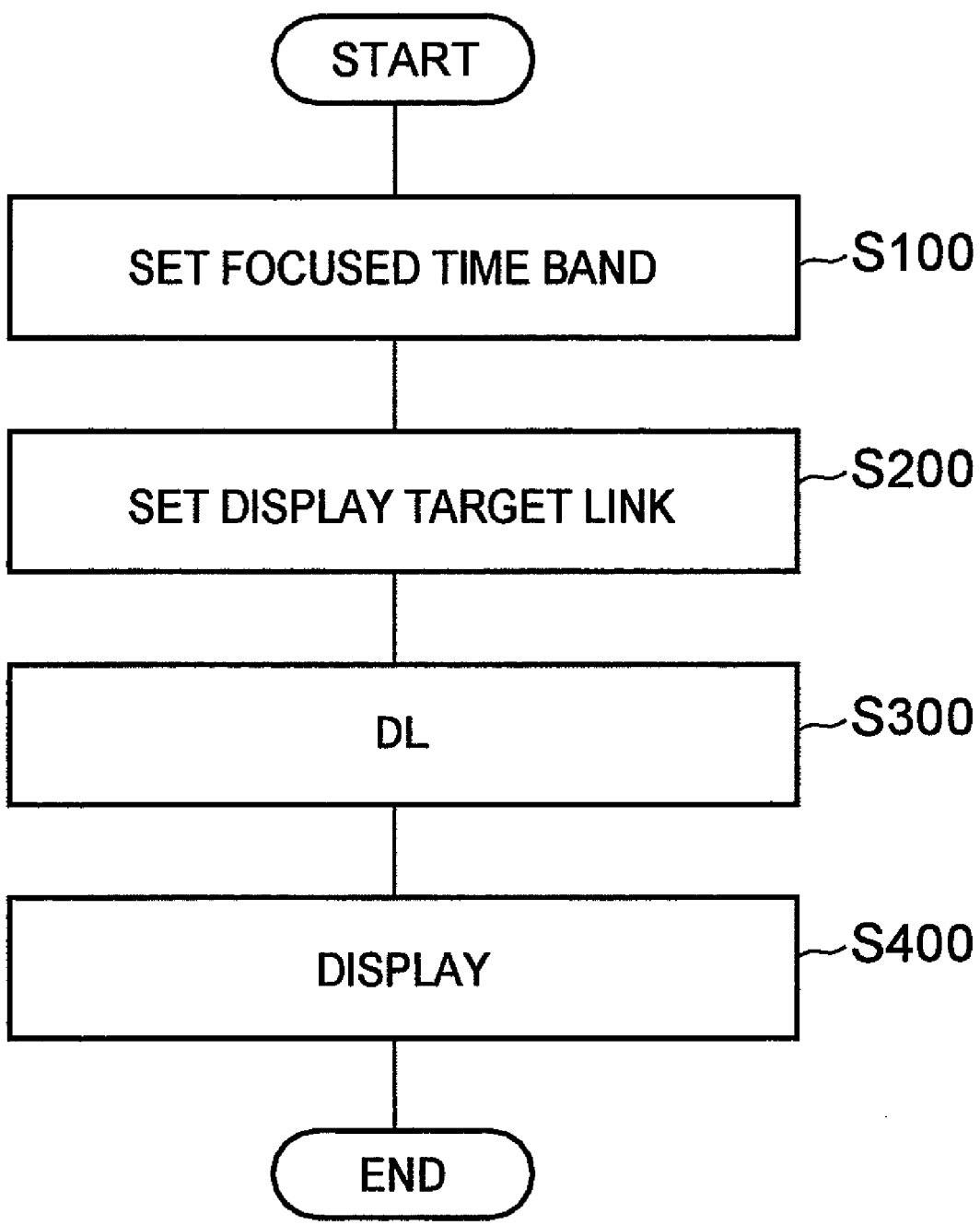
FIG. 11 is a flow diagram schematically showing processing of the in-vehicle type navigation device 100.

FIG. 11 is a flow diagram showing a process of the in-vehicle type navigation device 100 to display traffic information. The flow starts when the user operation analyzer 41 accepts a request from a user via the input unit 5, to display the traffic information such as traffic congestion information.

Firstly, the user operation analyzer 41 sets a time band of the traffic information to be displayed (referred to as "focused time band") (S100). If the time band is designated via the input unit 5 from the user, the user operation analyzer 41 sets the time band as the focused time band. If there is no designation being accepted, the user operation analyzer 41 sets the time band to which the current time belongs as the focused time band. Alternatively, if a departure time is set for route searching, the time band to which the departure time belongs is set as the focused time band.

Figure 12:
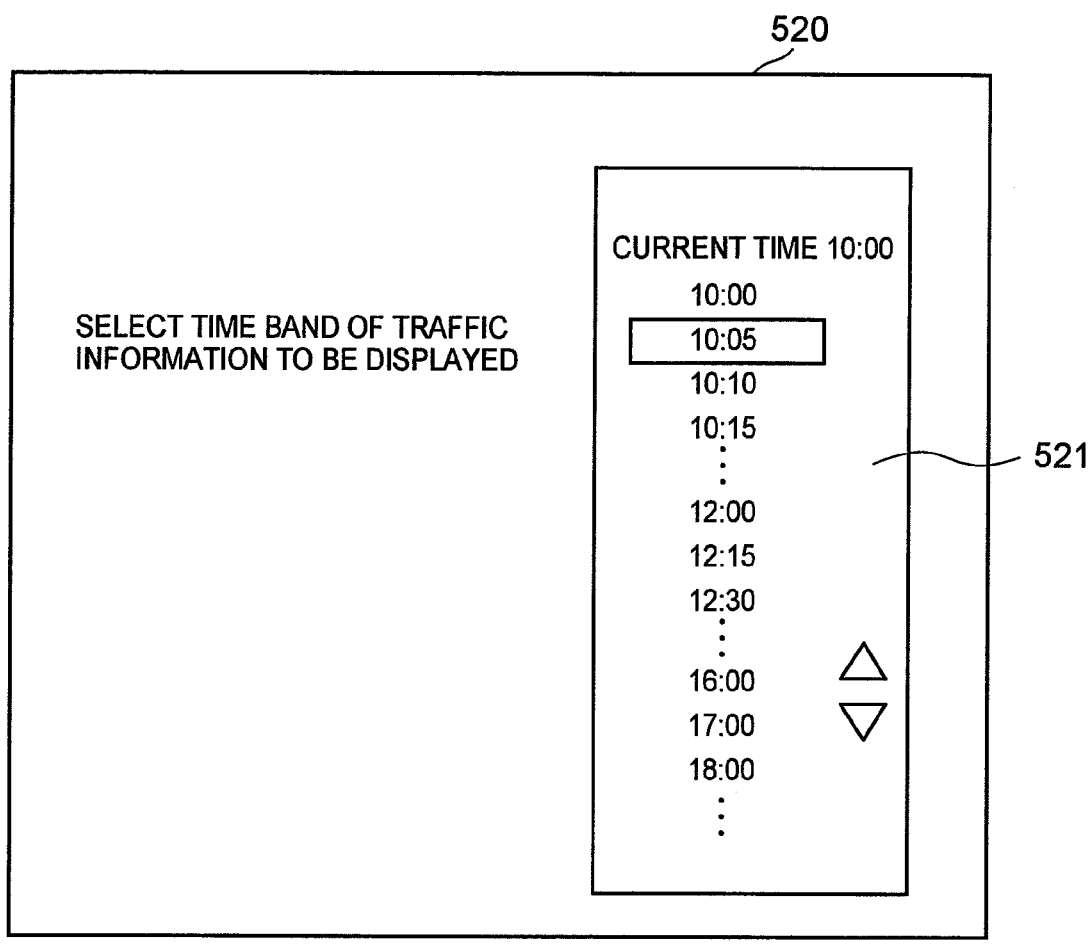
FIG. 12 is a display example showing a setting screen to set a focused time band.

FIG. 12 is an example displaying a setting screen to set the focused time band. The display screen 520 displays options 521 to select a time band of the traffic information to be displayed, and any time band can be selected via the input unit 5.

Next, the user operation analyzer 41 sets a target mesh area to display the traffic information (S200) The user operation analyzer 41 assumes the mesh close to the current position (for example, within a 20-kilometer radius of the current position) as a target mesh. If route searching is performed, a mesh including a link on the searched route is assumed as a target mesh that displays the traffic information.

Next, the communication processor 47 requests the traffic information distribution server 200 via the network communication unit 14, to transmit the real-time predicted traffic information and the real-time control information. On this occasion, the communication processor 47 requests that the real-time predicted traffic information and the real-time control information, associated with the focused time band set in S100, and also associated with the target (mesh) that is set in S200, be transmitted.

Upon receipt of this request, the traffic information distribution server 200 extracts, from the real-time predicted traffic information 210 stored in its own storage unit, a real-time traffic information item within the focused time band designated and associated with the mesh designated. Further, the traffic information distribution server 200 extracts, from the real-time control information 220 stored in its own storage unit, the real-time control information item within the designated focused time band and associated with the link included in the designated mesh. It is to be noted that the traffic information distribution server 200 determines which link belongs to which mesh, based on the map data stored in its own storage unit. Then, the traffic information distribution server 200 transmits the extracted real-time predicted traffic information item and the real-time control information item to the in-vehicle type navigation device 100.

The communication processor 47 stores, in the received information storage unit 48, the real-time predicted traffic information item and the real-time control information item that have been downloaded (S300).

Next, the display processor 45 displays the traffic information on the display 2, by using the real-time control information item and the real-time predicted traffic information item that have been downloaded, and the control information and the statistical traffic information stored beforehand in the storage unit 3 (S400). In the example here, an explanation is given as to cases where traffic congestion degree and the control information are displayed for a target mesh set in S200. However, it is also possible to display travel time instead of the traffic congestion degree.

Figure 13:
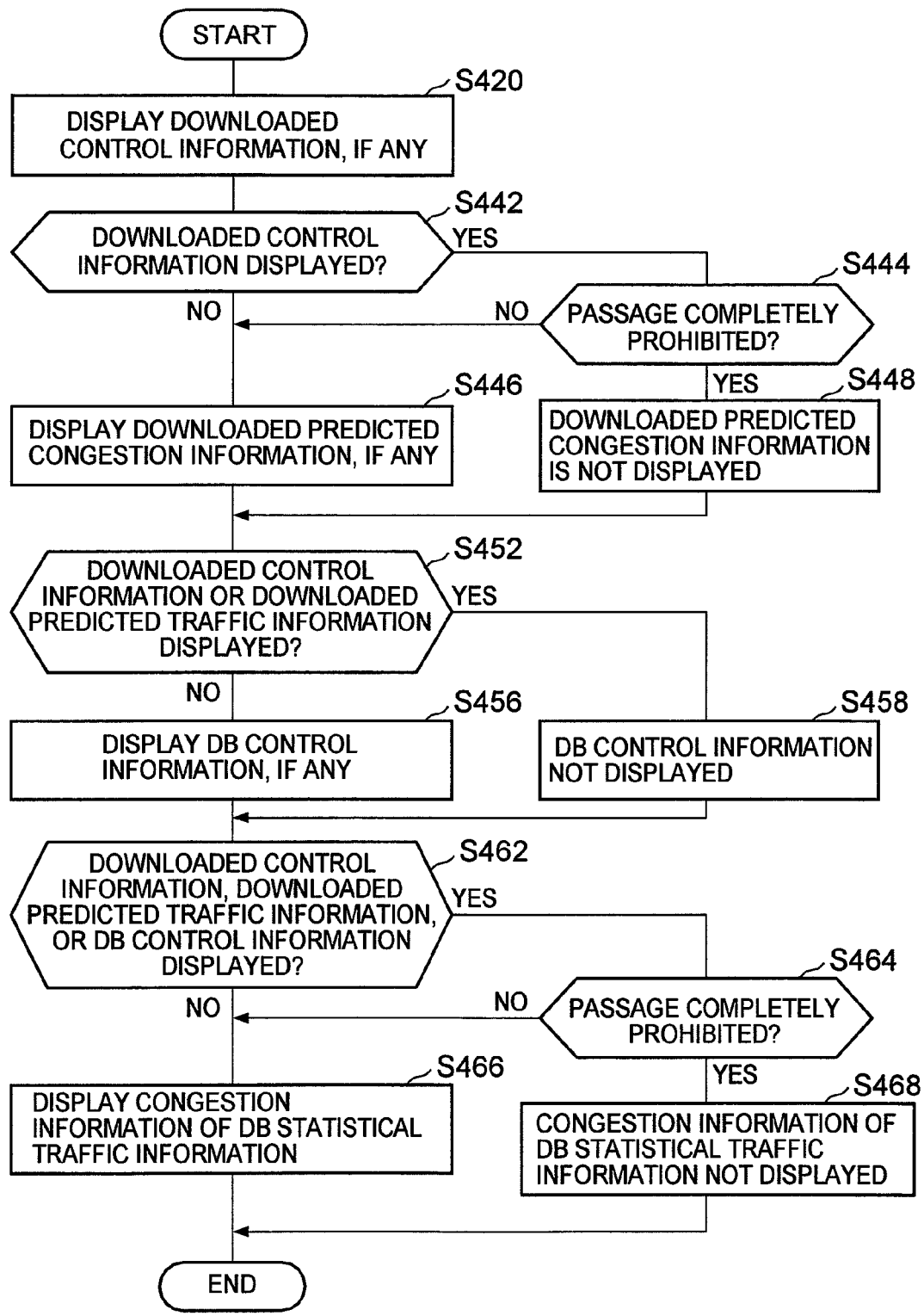
FIG. 13 is a flow diagram showing a displaying process of S400 in FIG. 11.

FIG. 13 is a flow diagram that shows displaying process flow.

The display processor 45 performs processing as shown in FIG. 12, with respect to each link that is a display target of the traffic information.

The display processor 45 determines, as to a link in the mesh within a range displayed on the display 2 (referred to as "target link"), whether or not there is real-time control information having been downloaded in each link. If such real-time control information exists, it is displayed.

Specifically, a check is made as to whether or not there exists a real-time control information item associated with the target link, and also associated with the focused time band set in S100, within the real-time control information that has been downloaded. In other words, a check is made as to whether or not there exists a record of the real-time control information, the date and time 222 of which belong to the focused time band, and the target link of which is included in the link ID 225 of the control target. If such a record exists, the control type 221 is displayed for the target link (S420). On the other hand, if there is no such record, the processing shifts to the next step S442.

Next, the display processor 42 determines whether or not the real-time control information (control type) is displayed in S420 (S442).

If the real-time control information is not displayed (No in S442), the display processor 45 checks whether or not there is real-time predicted traffic information that has been downloaded. If such information exists, it is displayed.

Specifically, a check is made as to whether or not there exists a record of the real-time predicted traffic information, the time band 213 of which belongs to the focused time band, and the link ID 212 being the link ID of the target link. If there is such a record, the traffic congestion degree 215 is displayed for the target link (S446). If there is no such record, the processing shifts to the next step S542.

On the other hand, in S420, if the real-time control information is displayed (Yes in S442), the display processor 45 determines whether the displayed real-time control information indicates that passage is completely prohibited (S444). If the control information indicates complete passage prohibition such as "Road closed" (Yes in S444), the display processor 45 does not display the real-time predicted traffic information (S448), and the processing shifts to the next step S452. On the other hand, if the control information does not indicate complete passage prohibition, as in "speed restriction" or "one-way restriction" (No in S444), the display processor 45 performs the processing in S446 as described above.

Next, the display processor 45 determines whether the real-time control information item is displayed in S420, or the real-time predicted traffic information item is displayed in S446. If neither of the information items are displayed (No in S452), the display processor 45 checks whether or not control information 330 stored beforehand in the storage unit 3 exists concerning the target link. If such information exists, it is displayed.

Specifically, a check is made as to whether or not the control information 330 stored beforehand in the storage unit 3 includes control information that is associated with the target link, and also associated with the focused time band set in S100. In other words, a check is made as to whether or not there is a record of the control information 330, the date and time 332 of which belongs to the focused time band, and the control target link ID 335 including the link ID of the target link. If there is such record, the type of control 331 is displayed for the target link (S456).

On the other hand, either when there is no such record, or when the control information is displayed in S420 or the predicted traffic information is displayed in S446 (Yes in S452), processing of the display processor 45 shifts to the next step S462.

Next, the display processor determines whether or not the real-time control information is displayed in S420, the real-time predicted traffic information is displayed in S446, or the control information is displayed in S456. If none of these information items is displayed (No in S462), the display processor 45 displays, for the target link, the traffic congestion degree of the statistical traffic information 320 stored in the storage unit 3.

Specifically, the display processor extracts, from the statistical traffic information 320 stored beforehand in the storage unit 3, the date and time 3221 and the time band statistical values 3223, corresponding to the focused time band, extracts the traffic congestion degree included in the statistical values, and displays the extracted data as the traffic congestion degree of the target link (S466).

On the other hand, if the real-time control information, the real-time predicted traffic information, or the control information stored beforehand is displayed, the display processor 45 determines whether or not the target link is configured such that passage is completely prohibited. If it is set in such a manner that passage is completely prohibited according to the control information of "Road closed" (Yes in S464), the display processor 45 does not display the congestion degree of the statistical traffic information, and ends the displaying process.

On the other hand, even in the case where control exists, if the control indicates "speed restriction" or "one-way restriction", and it does not indicate the complete prohibition of passage, the display processor 45 displays the congestion degree of the statistical traffic information by the aforementioned step S466, and ends the displaying process with regard to the target link.

In the above description, the process for displaying the traffic congestion degree and the control information has been explained.

Figure 14:
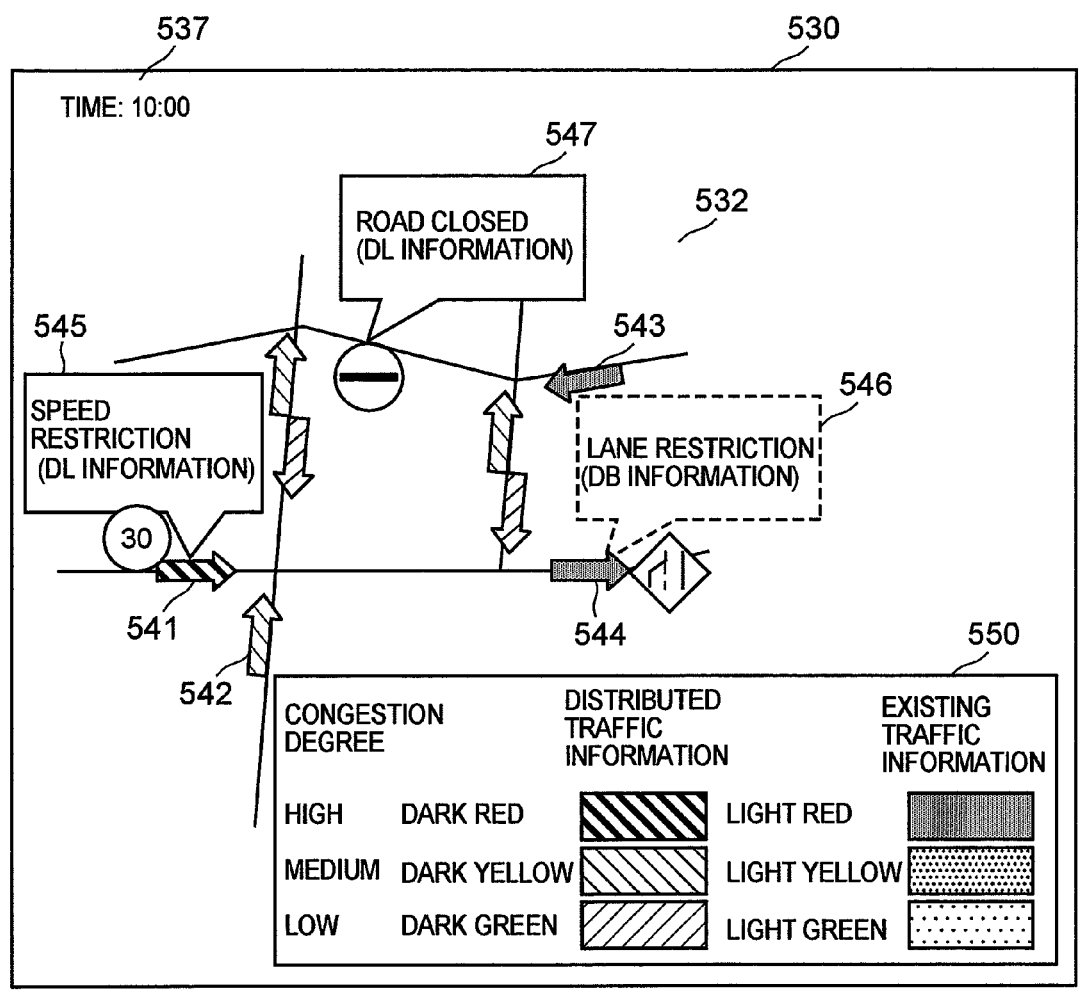
FIG. 14 is a display example showing traffic information.

FIG. 14 illustrates a display example according to the processing above.

As illustrated, the display screen 530 shows, on the map 532, the congestion degree during the focused time band 537, by using display items (arrows in the figure) 541, 542, 543, and 544. The direction of the arrow representing the congestion degree indicates the direction in which the vehicle travels.

The display processor 45 displays the congestion degrees 541 and 542 of the downloaded real-time predicted traffic information, in a manner different from the manner for displaying the congestion degrees 543 and 544 of the statistical traffic information. For example, they may be distinguished by color shading.

In the example of FIG. 14, the display processor 45 displays the congestion degree (arrow) of the downloaded real-time predicted information in a dark color, compared to the congestion degree (arrow) of the statistical traffic information. Moreover, the degrees of the traffic congestion are distinguished by the color of the arrow, and ranking of the degrees, from highest to lowest, is indicated by red, yellow, and green.

Furthermore, as illustrated, the control information items 545, 546, and 547 in the focused time band are displayed. The control information items may be displayed using icons such as traffic signs.

If the control information indicates that passage is completely prohibited, such as when there is "Road closed" (Yes in S444), the display processor 45 does not display the congestion degree. In other words, the congestion degree is not displayed for the link that is a target of the control information 547.

If the control information does not indicate that the passage is completely prohibited, such as when there is a road closure (No in S444), the display processor 45 displays the congestion degree. In other words, the congestion degree 541 is displayed for the link that is a target of the control information 545.

If the control information and the downloaded traffic congestion degree are displayed, the display processor 45 does not display the control information, stored beforehand, and the congestion degree of the statistical traffic information. On the other hand, if the downloaded control information and the traffic congestion degree are not displayed, the display processor 45 displays the control information 546, stored beforehand, and the congestion degree 544 of the statistical traffic information.

One embodiment of the present invention has been explained so far.

According to the present embodiment, the traffic congestion information and the control information within the same focused time band are displayed on the same screen. In other words, control information that is irrelevant to the focused time band is not displayed. Therefore, this configuration does not clutter the screen.

In addition, if control information indicating that passage is completely prohibited is displayed, the congestion information is not displayed. Therefore, it is possible to avoid a situation where meaningless information is displayed.

In addition, displaying the traffic information received from the server device has a higher priority than displaying the traffic information stored beforehand. Therefore, more reliable traffic information is displayed.

The above embodiment can be variously modified.

By way of example, if both the downloaded control information and the control information, stored beforehand, exist, both information items may be displayed in a different manner, not displaying only either one of them. Alternatively, at least a part of the downloaded control information (e.g., an icon) may be displayed in a superimposed manner on the display of the control information that was stored beforehand (e.g., an icon), thereby distinguishing reliable information from other information.

Figure 15:
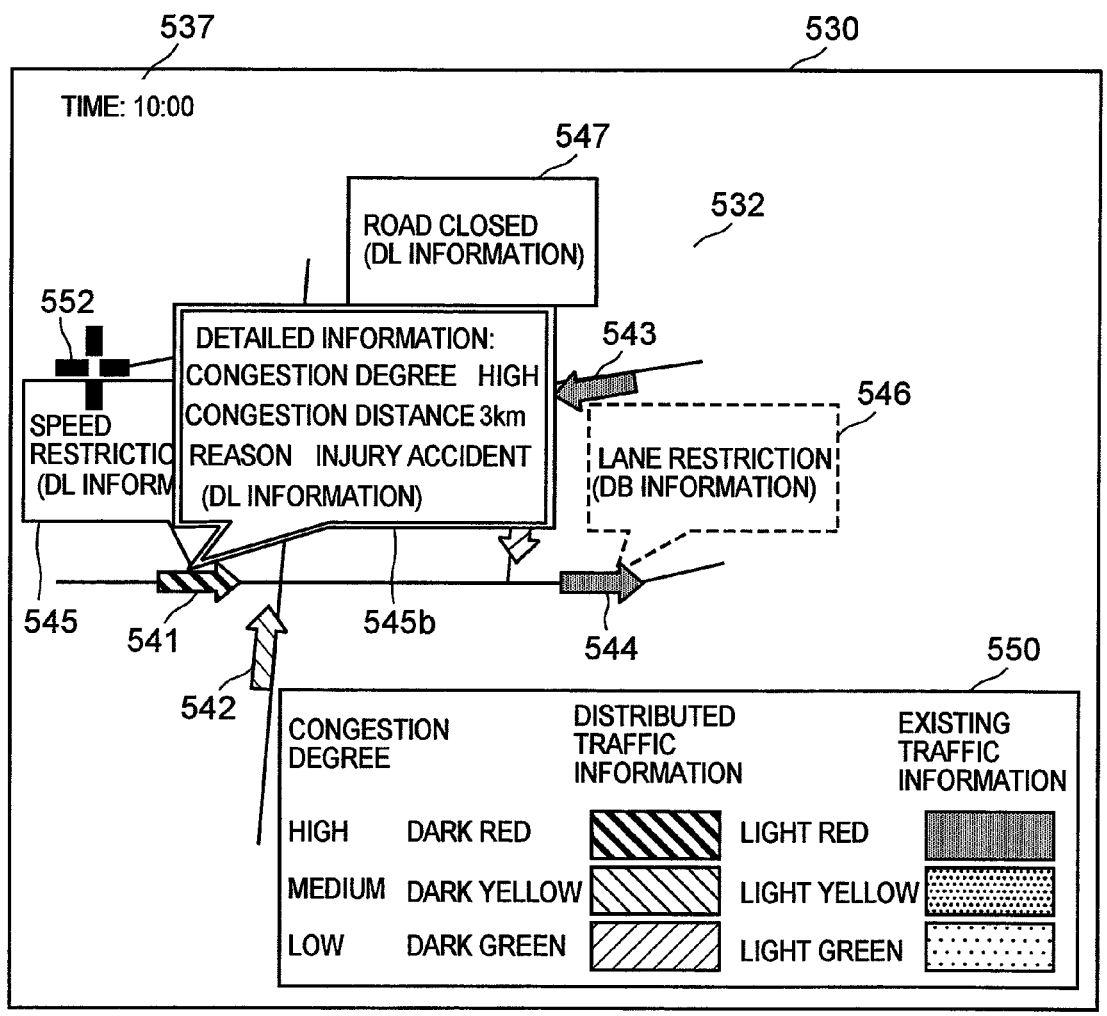
FIG. 15 is a display example showing traffic information.

The display processor 45 may display detailed information items 223 and 333 of the control information, when the cursor on the screen is positioned on the control information displayed or in proximity thereto. FIG. 15 is a display example of the case above. Since the cursor 552 is positioned in proximity to the control information 545, the detailed information 545b. is displayed.

Figure 16:
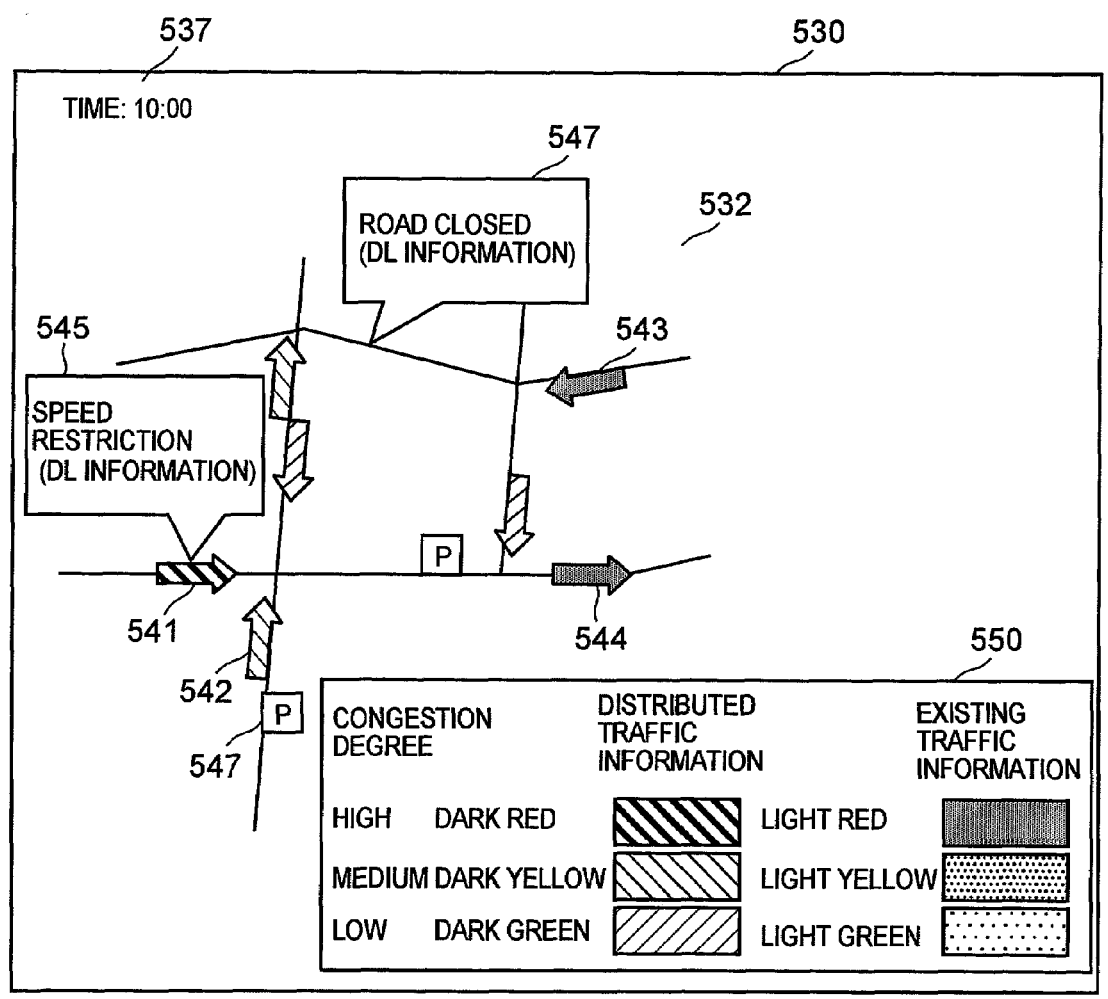
FIG. 16 is a display example showing traffic information.

It is further possible to display a parking lot that is open for business during the focused time band. The in-vehicle type navigation device 100 holds, in the storage unit 3, position information and business hour information for each parking lot (parking lot information). The parking lot information may be stored beforehand in the storage unit 3, or it may be received from the traffic information distribution server 200 and stored in the storage unit 3. As shown in FIG. 16, the display processor 45 extracts, from the parking lot information, an information item concerning a parking lot open for business during the focused time band, and displays the extracted information. With this configuration, only the parking lot 547 open for business during the focused time band is displayed.

It is to be noted that not only the parking lot, but also information of stores that open and close at a certain time (such as service stations) may be obtained by the in-vehicle type navigation device 100, and only the stores that are open for business during the focused time band may be displayed.

Change of the focused time band may be received in the following way.

Figure 17:
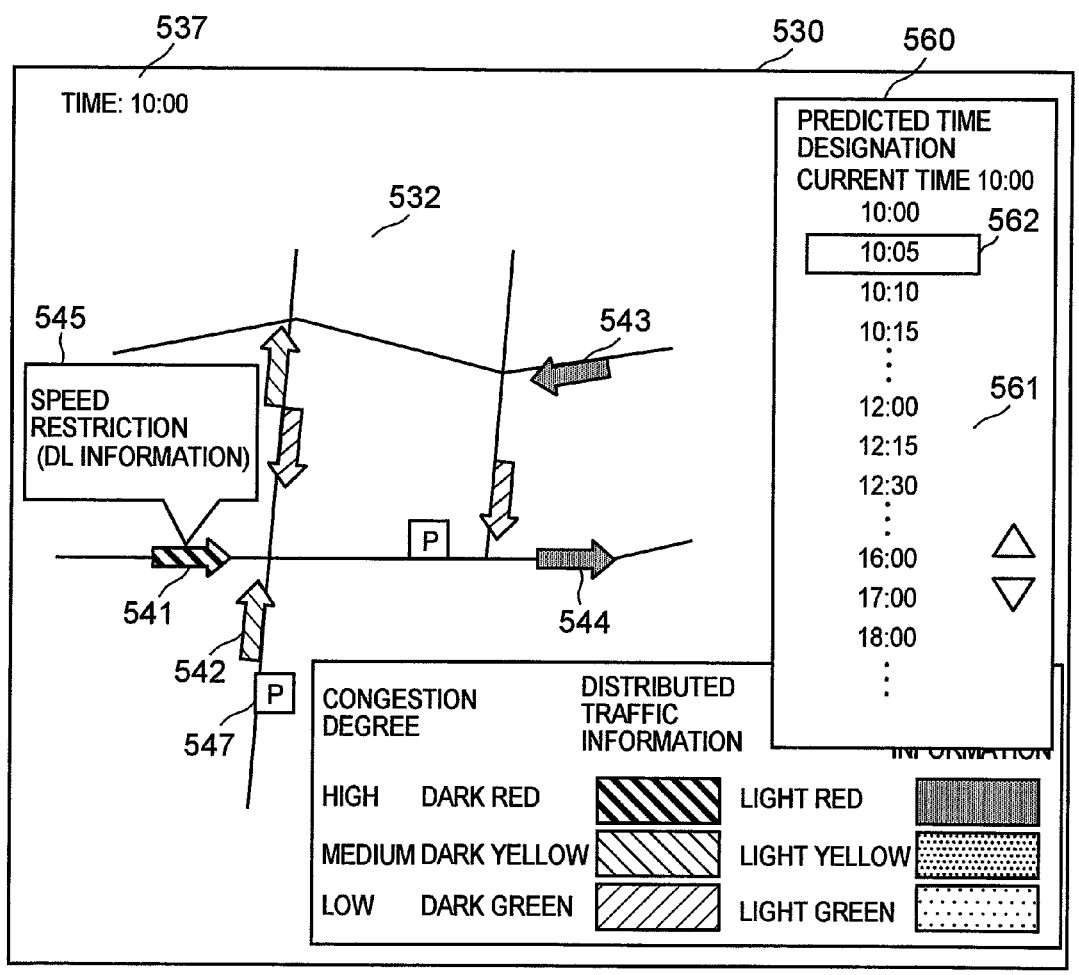
FIG. 17 is a display example showing a setting screen to set the focused time band.

FIG. 17 is a screen display example showing a situation where a request to change the focused time band is received while the traffic information is displayed. The display processor 45 displays a screen 560 for designating the focused time band. On this occasion, a designation of time band from some options is accepted. Furthermore, narrower intervals are set in the time options, approaching the current time. On the other hand, wider intervals are set, when distant from the current time. By way of example, a time option of every five minutes is displayed within one hour of the current time, a time option of every fifteen minutes is displayed within one to three hours of the current time, and a time option of every hour is displayed for more than three hours from the current time. From these time options, designation of a focused time band is accepted. For example, the display processor 45 may set the time period within thirty minutes of the designated time, as the focused time band.

Accordingly, it is possible to configure fine settings around the current time, thereby enhancing the usability.

Figure 18:
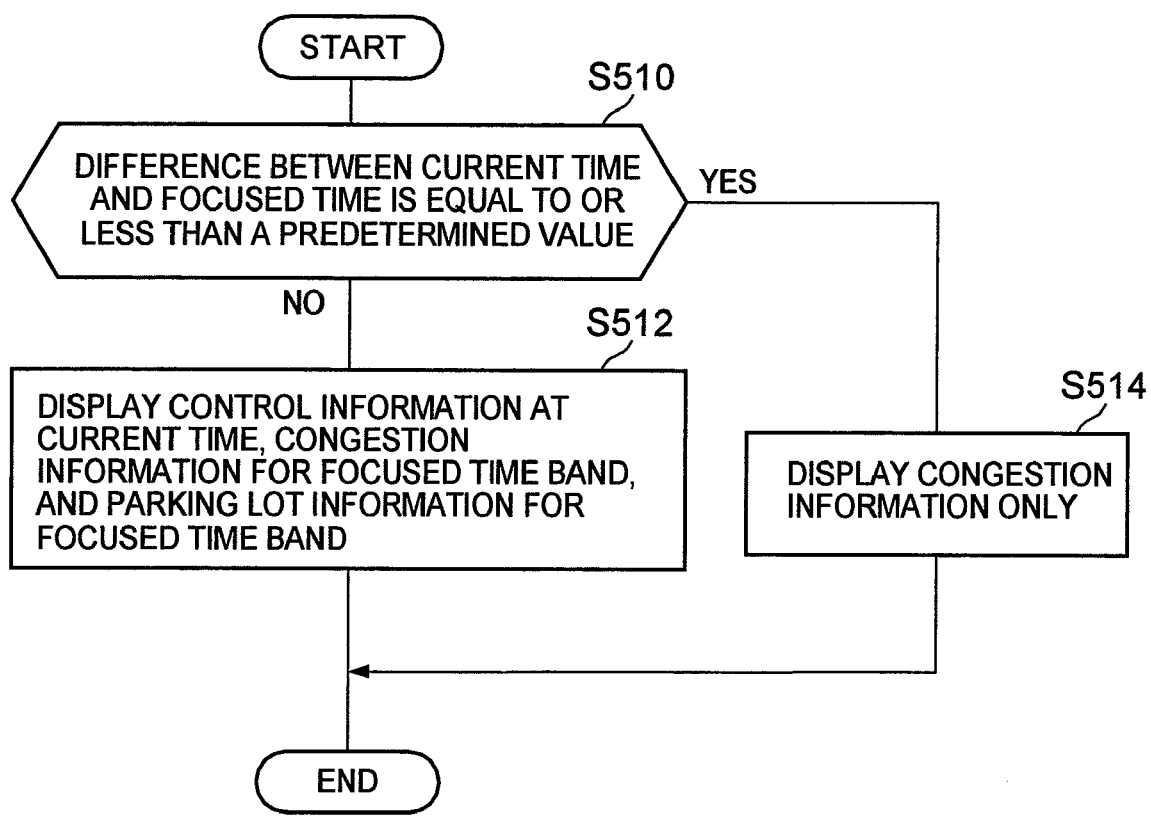
FIG. 18 is a flow diagram showing a displaying process relating to a modified example.

In the embodiment above, an explanation has been given regarding a configuration in which the traffic congestion information and the control information during the focused time band are displayed. However, the present invention is not limited to this example. It is further possible that, for the traffic congestion information, the information during the focused time band is displayed and, for the control information, the information at the current time is displayed. FIG. 18 shows the processing flow for this case.

The display processor 45 determines whether the difference between the current time and the focused time band (e.g., the mid-point of the focused time band) is less than a predetermined value (e.g., two hours) (S510).

If the difference is less than the predetermined value, the display processor 45 displays the control information at the current time and the traffic congestion information in the focused time band on the map on the same screen. Also in the case where a parking lot is displayed, a parking lot open for business during the focused time band is displayed (S512). In other words, the processes from S420 to S468 as shown in FIG. 13 are performed.

On the other hand, if the difference between the current time and the focused time band is equal to or more than the predetermined value (No in S510), the display processor 45 displays only the traffic congestion information in the focused time band. The control information is not displayed (S514). In other words, the processes S420 and S456 are skipped in the processes from S420 to S468.

According to this flow, considering that the traffic controls are subject to continue for a certain period of time, it is possible to select and display the traffic congestion information and the control information, which are to be displayed.

Figure 19:
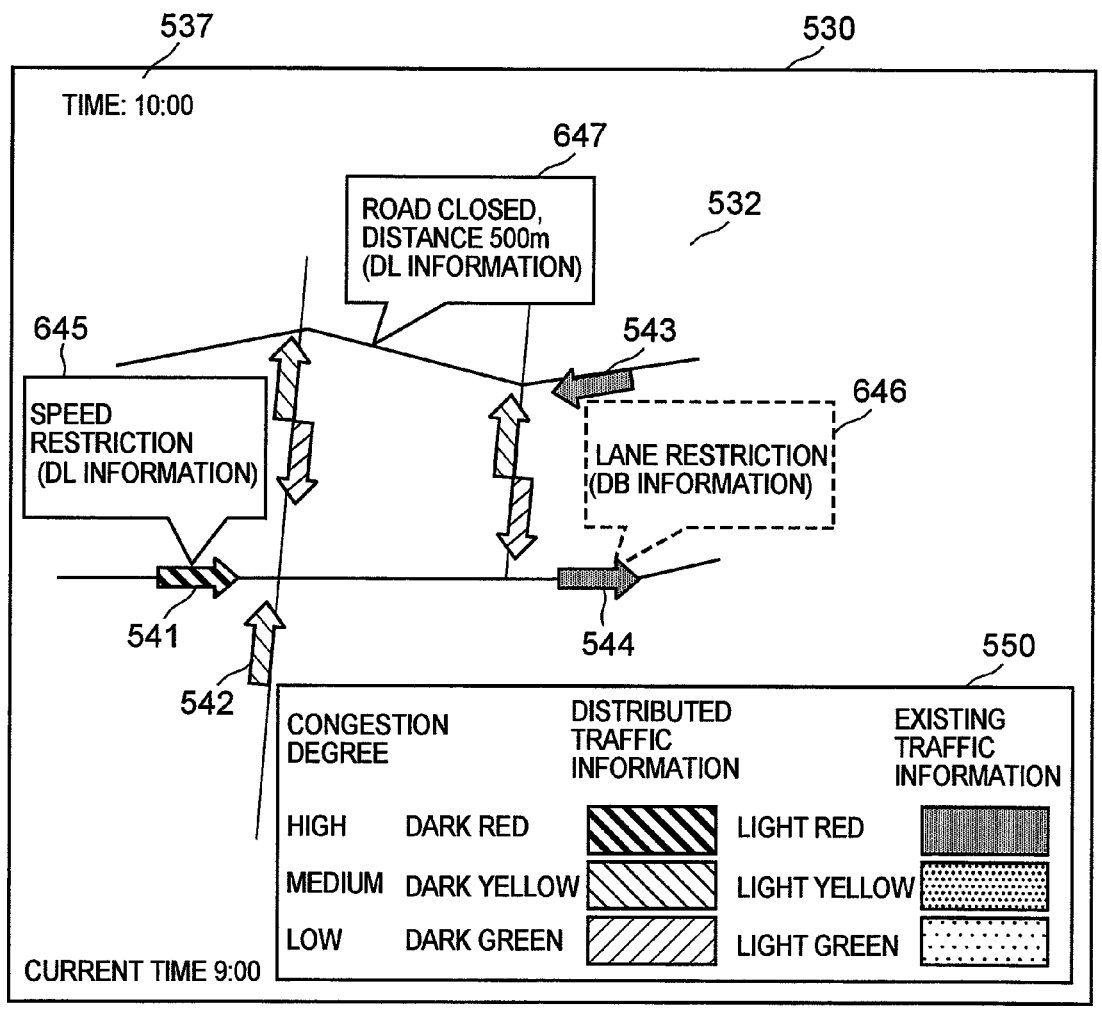
FIG. 19 is a display example showing traffic information relating to the modified example.

FIG. 19 is a display example for the case above. The control information items 645, 647, and 646 are control information items at the current time. The traffic congestion information items 541, 542, 543, and 544 are traffic congestion information in the focused time band.

In addition, when displaying the current traffic information, which is the traffic information at the current time, is switched to displaying future traffic information after the current time (real-time predicted traffic information and statistical traffic information), the traffic congestion information only may be displayed, without displaying the control information.

It is to be noted that the examples above have been explained for where the present invention is applied to an in-vehicle type navigation device. However, the present invention may also be applied to navigation devices other than the in-vehicle device.

What is claimed is:

1. A navigation device for providing real-time navigation guidance with respect to any of a plurality of selectable time bands, including a current time band and at least one future time band, where each time band corresponds to a range of time in a day, the navigation device comprising,
   a setting unit adapted to selectably set a focused time band indicating one future time band of the at least one future time band,
   a control info obtaining unit adapted to obtain from a remote source, in real-time in advance of the focused time band, current control information at a current time,
   a congestion info obtaining unit adapted to obtain from the remote source, in real-time in advance of the focused time band, traffic congestion information for the focused time band, and
   a display unit adapted to display, on one screen, the obtained current control information and the traffic congestion information for the focused time band.

2. A navigation device for providing real-time navigation guidance with respect to any of a plurality of selectable time bands, including a current time band and at least one future time band, where each time band corresponds to a range of time in a day, the navigation device comprising,
   a control info obtaining unit adapted to obtain current control information at a current time for a road,
   a congestion info obtaining unit adapted to obtain traffic congestion information for each time band,
   a setting unit adapted to selectably set a focused time band indicating one future time band of the at least one future time band,
   a control info extracting unit adapted to extract, from the current control information, a control information item that includes a control time that is within the focused time band,
   a congestion info extracting unit adapted to extract, from the traffic congestion information, in real-time in advance of the focused time band, a traffic congestion information item of the focused time band, and
   a display unit adapted to display the current control information item and the extracted traffic congestion information item of the focused time band, on screen.

3. The navigation device according to claim 2, wherein, when a control information item and a traffic congestion information item concerning the same road are extracted, the display unit selects one of either of the information items, and displays the selected information item concerning the road.

4. The navigation device according to claim 2, wherein, when a control information item and a traffic congestion information item concerning the same road are extracted, the display unit displays the current control information concerning the road.

5. The navigation device according to claim 2, wherein, when a control information item and a traffic congestion information item concerning the same road are extracted, the display unit displays the control information item concerning the road without displaying the traffic congestion information item, if the control information item indicates that passing through the road is prohibited.

6. The navigation device according to claim 2, wherein, the control information item is downloaded or received from a server device that distributes traffic information, or is stored beforehand in a storage unit of the navigation device, and
   the traffic congestion information item is downloaded from the server device, or stored beforehand in the storage unit of the navigation device.

7. The navigation device according to claim 6, wherein, if a control information item received from the server device and a control information item stored beforehand in the storage unit, concerning the same road, exist, the control information received from the server device is displayed.

8. The navigation device according to any one of claims 1 to 7, further comprising a parking info obtaining unit adapted to obtain parking lot information including business hours, wherein,
   the display unit uses the parking lot information to display a parking lot that is open for business in the focused time band.

9. The navigation device according to any one of claims 1 to 7, further comprising an options display unit adapted to display time options for setting the focused time band, wherein,
   time intervals of the time options are narrower, the closer the time is to the current time.

10. A navigation device for providing real-time navigation guidance with respect to any of a plurality of selectable time bands, including a current time band and at least one future time band, where each time band corresponds to a range of time in a day, the navigation device comprising,
    a setting unit adapted to selectably set a focused time band indicating one future time band of the at least one future time band,
    a current info obtaining unit adapted to obtain from a remote source, in real-time in advance of the focused time band, current control information at the current time, for the focused time band,
    a congestion info obtaining unit adapted to obtain from the remote source, in real-time in advance of the focused time band, traffic congestion information for the focused time band, and
    a display unit adapted to display, on one screen, the obtained current control information and the traffic congestion information for the focused time band.

11. The navigation device according to claim 10, wherein, when a difference between the current time and the focused time band is less than a predetermined value, the display unit displays, on the same screen, the obtained current control information and the traffic congestion information.

12. The navigation device according to either of claim 10 or claim 11, wherein,
    the traffic congestion information is downloaded or received from the server device that distributes the traffic information.

13. The navigation device according to claim 2, wherein, when displaying of the current traffic information is switched to displaying of predicted congestion information after the current time, the display unit does not display the current control information.

14. The navigation device according to claim 2, wherein, when a cursor is placed on a display of the current control information, the display unit displays details of control.

* * * * *